(12) United States Patent
Kawada

(10) Patent No.: US 6,608,407 B2
(45) Date of Patent: Aug. 19, 2003

(54) LINEAR MOTOR ARMATURE

(75) Inventor: Shuichi Kawada, Fukui (JP)

(73) Assignee: Sodick Co., Ltd., Kanagawa (JP)

( * ) Notice: Subject to any disclaimer, the term of this patent is extended or adjusted under 35 U.S.C. 154(b) by 0 days.

(21) Appl. No.: 09/820,172

(22) Filed: Mar. 29, 2001

(65) Prior Publication Data

US 2002/0047323 A1 Apr. 25, 2002

(30) Foreign Application Priority Data

Mar. 29, 2000 (JP) ........................................ 2000-091807

(51) Int. Cl.⁷ ............................. H02K 1/20; H02K 41/00
(52) U.S. Cl. ........................... 310/12; 310/13; 310/14; 310/15
(58) Field of Search ............................. 310/12, 13, 14, 310/18

(56) References Cited

U.S. PATENT DOCUMENTS

| 3,913,045 | A | | 10/1975 | Von Starck |
| 4,705,971 | A | * | 11/1987 | Nagasaka ..................... 310/12 |
| 5,175,455 | A | | 12/1992 | Penicaut |
| 5,703,418 | A | | 12/1997 | Assa |
| 5,831,353 | A | | 11/1998 | Bolding et al. |

FOREIGN PATENT DOCUMENTS

| JP | 409154272 | * | 6/1997 | .......... H02K/41/02 |
| JP | A 11-89209 | | 3/1999 | |
| JP | 2000-023499 | | 1/2000 | |

* cited by examiner

Primary Examiner—Burton S. Mullins
Assistant Examiner—Iraj A Mohandesi
(74) Attorney, Agent, or Firm—McDermott, Will & Emery; Paul Devinsky

(57) ABSTRACT

A linear motor armature (1) is constructed by connecting in series a front module (10), at least one intermediate module (20), and a back module (30). The front module includes a first fluid passage, one end of which can be connected to the outside of the armature and the other end of which is open to the back edge (11B) of the front module, and a fifth fluid passage, one end of which can be connected to the outside of the armature and the other end of which is open at the back edge of the front module. The at least one intermediate module includes a second fluid passage, one end of which is open at the front edge (21A) of the intermediate module and the other end of which is open at the back edge (21B) of the intermediate module, and a fourth fluid passage, one end of which is open at the front edge of the intermediate module and the other end of which is open at the back edge of the intermediate module. The intermediate module further includes a coil (4) and a flat cooling tube (3) having a U-shaped fold into which the coil can be fit. The back module includes a third fluid passage, (32) both ends of which are open at the front edge (31A) of the back module. Coolant can be circulated in the first fluid passage, the second fluid passage, the third fluid passage, the fourth fluid passage and fifth fluid passage in order.

16 Claims, 5 Drawing Sheets

LINEAR MOTOR ARMATURE

FIELD OF THE INVENTION

The present invention relates to a linear motor for generating linear movement. More particularly, the present invention relates to a linear motor armature having a number of coils aligned in the direction of the linear movement.

DESCRIPTION OF THE RELATED ART

A linear motor for a machine tool is known that causes a moving element, such as a table and a head, to linearly move at high speed. As a moving element of a machine tool is large in weight, and there is no speed reducing mechanism between the linear motor and the moving element, such linear motor needs to generate a large thrust. A linear motor for a machine tool typically includes a row of permanent magnets that are attached to a magnetic plate, and includes coils wound around cores at the top surfaces that face an air gap. Typically, a linear motor having a larger thrust is larger in size than a linear motor having a smaller thrust, and generates more heat in the coils than a smaller thrust linear motor does. For a larger thrust linear motor, more heat results as a result of including a cooling device for the coils, which enlarges the size of the linear motor.

Thanks to newer, more effective cooling devices, and stronger permanent magnets, compact linear motors having a sufficient thrust can be supplied for machine tools. Also, an effort has been directed towards making a moving element of a machine tool as light in weight as possible to avoid requiring an excessively large thrust to move the element. Recently, linear motors have become more widely used in a variety of machine tools. Accordingly, there is a need for linear motors having different thrusts.

SUMMARY OF THE INVENTION

An object of the present invention is to provide a linear motor armature that can be easily and promptly manufactured according to the required thrust and size needed to move a moving element of a machine tool. Another object of the present invention is to provide a method of manufacturing a linear motor armature with an excellent cooling capability that can be provided to linear motor armatures of varying sizes.

In order to achieve the above objects, a linear motor armature is constructed by connecting in series: a front module, at least one intermediate module following the front module, and a back module following the at least one intermediate module. The front module includes a first fluid passage, one end of which can be connected to the outside of the armature, and the other end of which is open to the back edge of the front module; and a fifth fluid passage one end of which can be connected to the outside of the armature, and the other end of which is open at the back edge of the front module. The at least one intermediate module includes a second fluid passage, one end of which is open at the front edge of the intermediate module, and the other end of which is open at the back edge of the intermediate module; and a fourth fluid passage, one end of which is open at the front edge of the intermediate module, and the other end of which is open at the back edge of the intermediate module. The intermediate module further includes a coil and a flat cooling tube having a U-shaped fold into which the coil, for example, fits into. The back module includes a third fluid passage, both ends of which are open at the front edge of the back module. Coolant can be circulated in the first fluid passage, the second fluid passage, the third fluid passage, the fourth fluid passage, and the fifth fluid passage, respectively.

Additional objects, advantages and novel features of the invention will be set forth in the description that follows, and will become apparent to those skilled in the art upon reading this description or practicing the invention. The objects and advantages of the invention may be realized and attained by practicing the invention as recited in the appended claims.

DESCRIPTION OF THE PREFERRED EMBODIMENTS

A linear motor armature according to an embodiment of the present invention will now be described making reference to FIG. 1, FIG. 2, FIG. 3, and FIG. 4.

Figure 1:
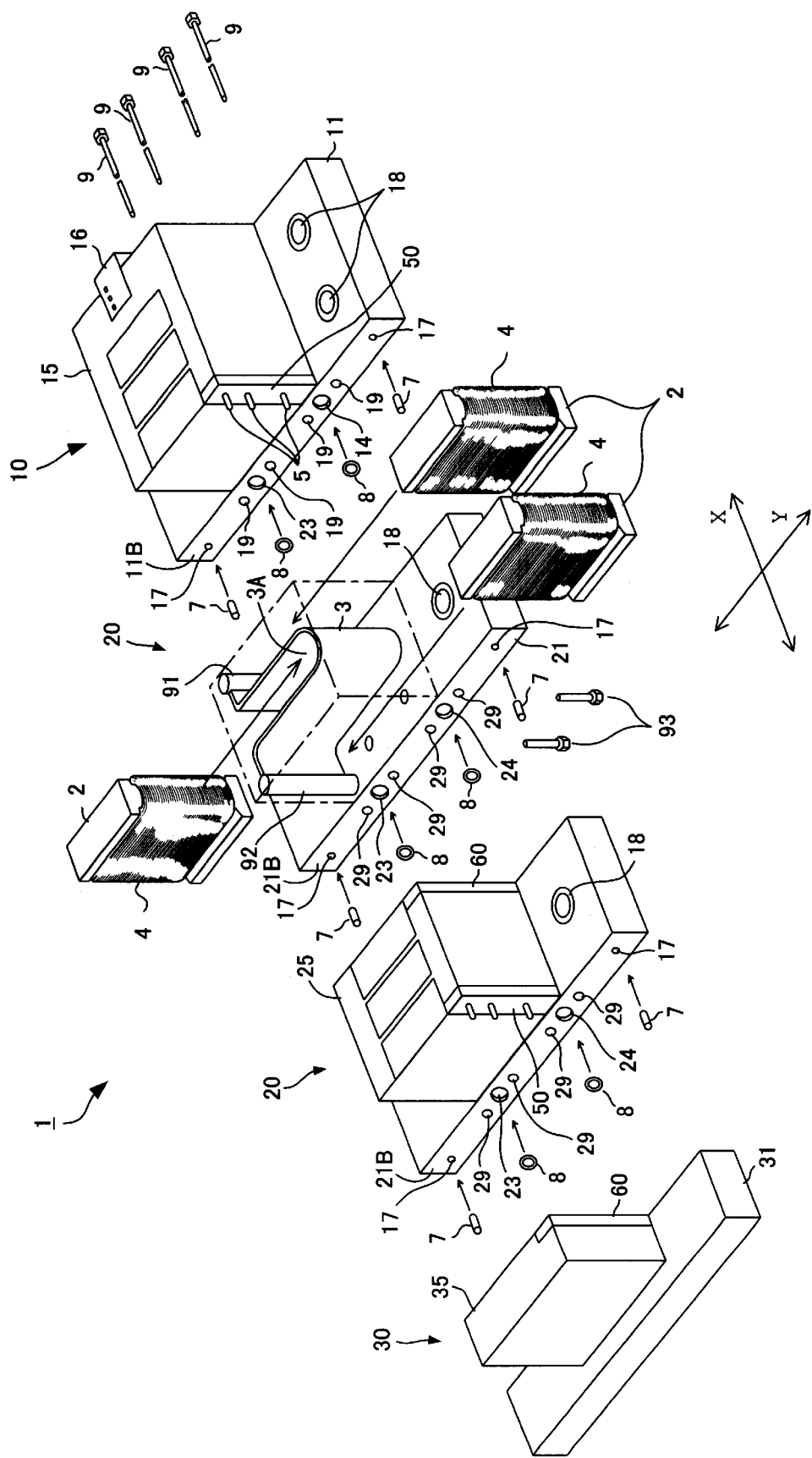
FIG. 1 is a perspective view depicting a linear motor armature of the present invention.
Figure 2:
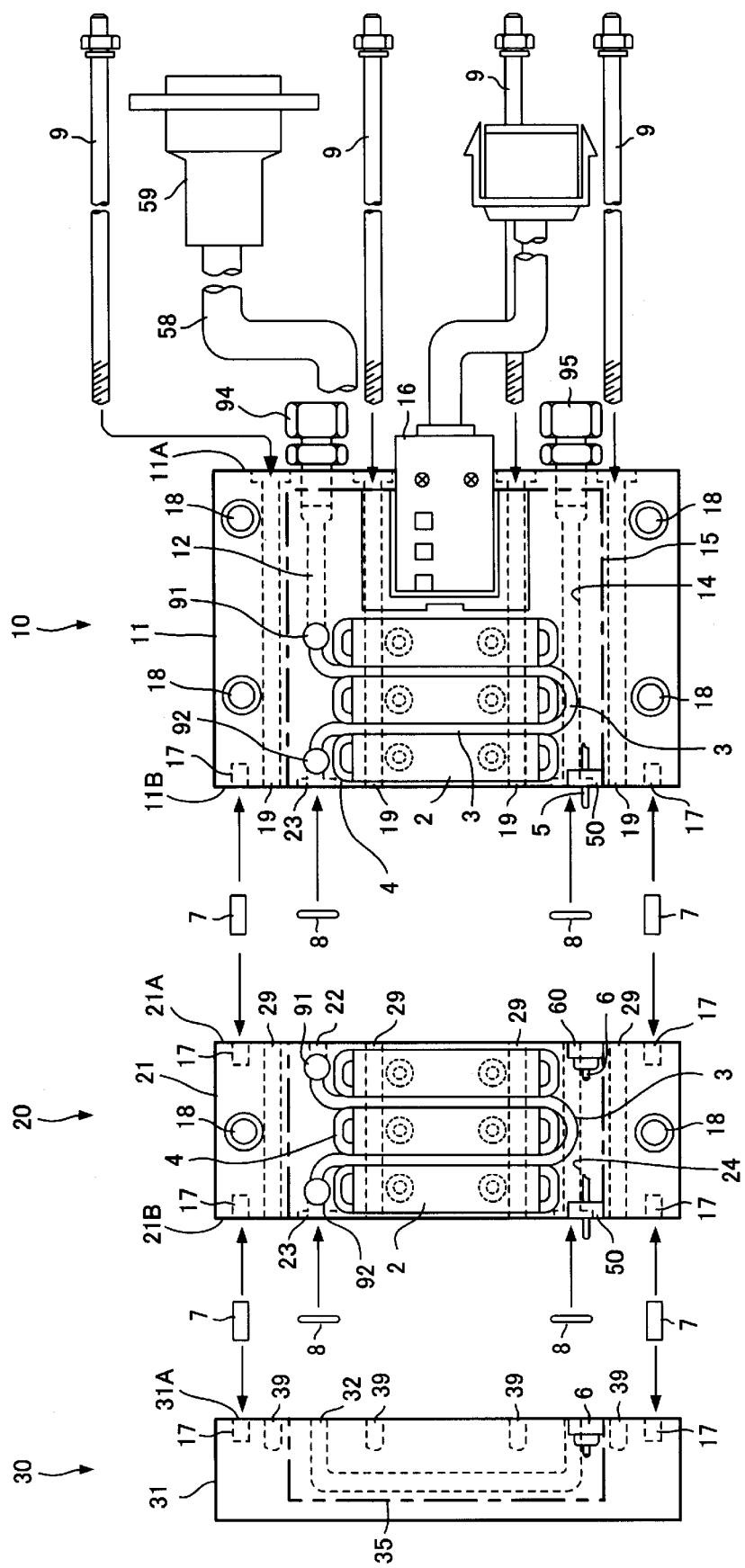
FIG. 2 is a plan view depicting the linear motor armature of FIG. 1.
Figure 3:
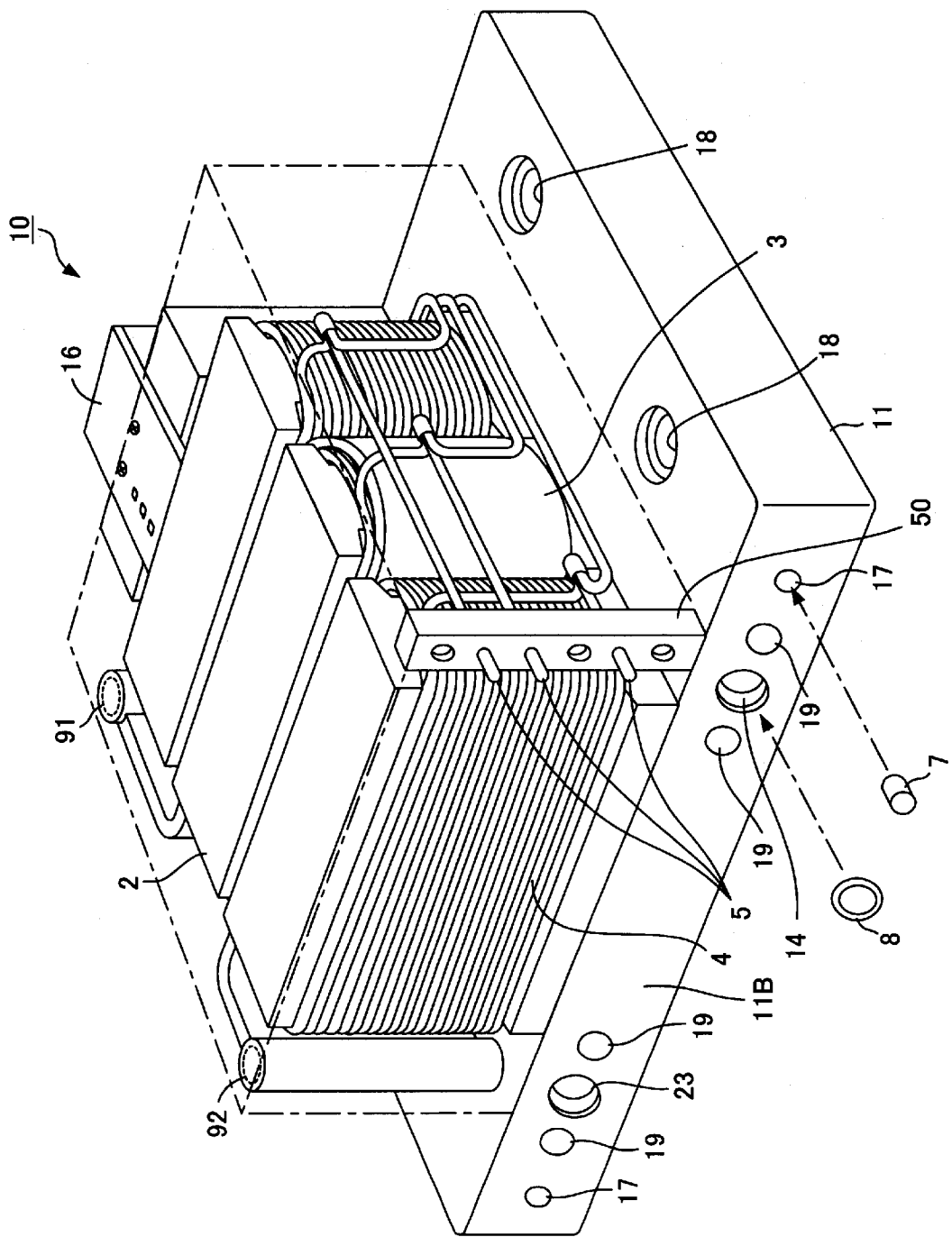
FIG. 3 is a perspective view depicting the front module of FIG. 1.
Figure 4:
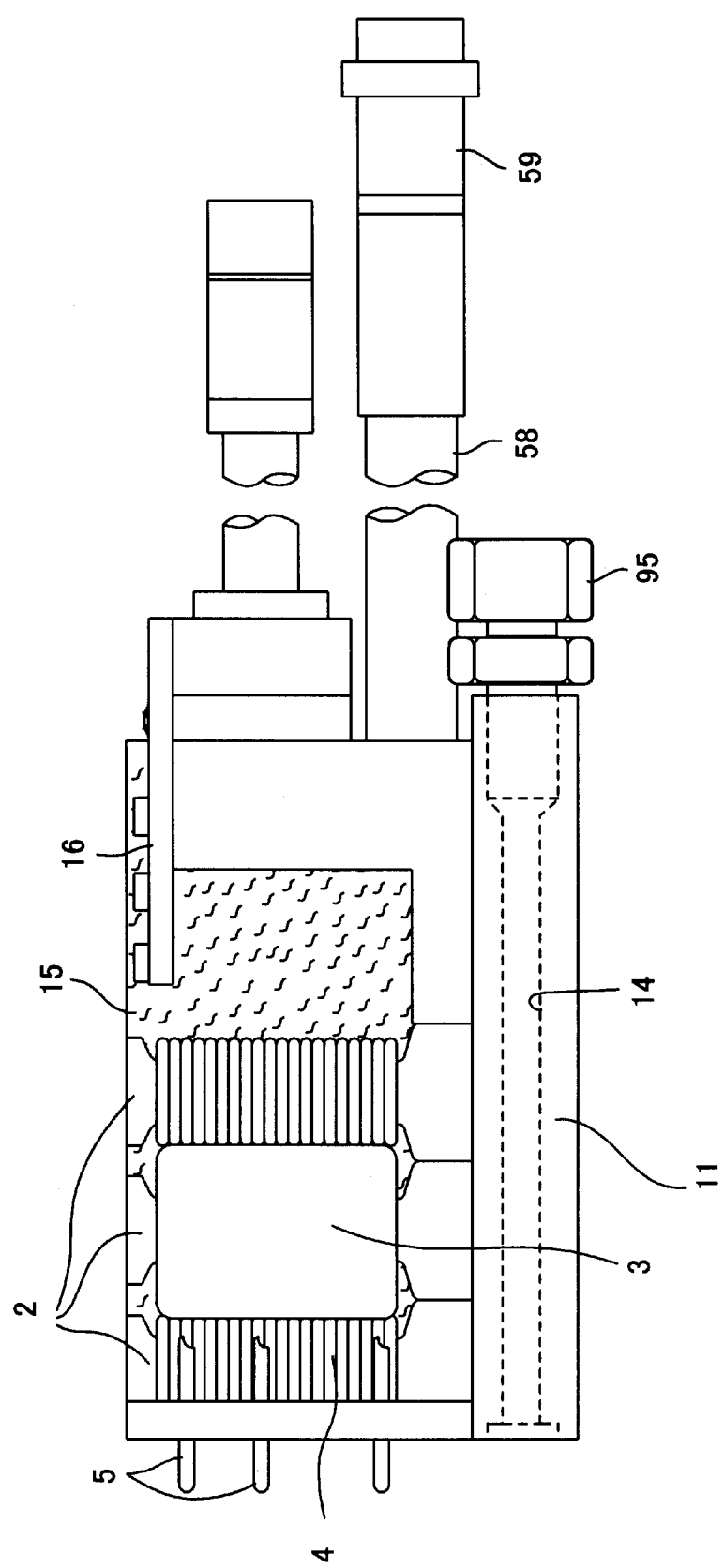
FIG. 4 is a side elevational view, partly in section, depicting the front module of FIG. 1.

An armature 1 of a linear, synchronous motor includes a number of coils 4 that are aligned in a longitudinal direction X, i.e., a direction of movement of the linear motor. Each of the coils 4 has a vertical coil axis perpendicular to the longitudinal direction X. The armature 1 is constructed by connecting a front module 10, at least one intermediate module 20, and a back module 30, respectively, in the longitudinal direction X. For purposes of simplification, only two intermediate modules 20 are illustrated in FIG. 1 and only one intermediate module 20 is illustrated in FIG. 2.

Firstly, the intermediate module 20 will be described in detail. The intermediate module 20 includes a rectangular base plate 21 and an aluminum flat cooling tube 3 in which coolant can be circulated. The length of the base plate 21 corresponds to the length of a row of coils 4, for example a row of three coils 4. The base plate 21 has a front edge 21A and a back edge 21B, both of which extend in a lateral direction Y perpendicular to the longitudinal direction X. The cooling tube 3 has a vertically elongated cross section. The height of the elongated cross section is preferably the same as, or slightly larger than, the height of the coils 4. The cooling tube 3 has a U-shaped fold that corresponds to the outline of the coil 4 so that the coil 4 can fit into the fold. Preferably, the cooling tube 3 has a number of vertically aligned small holes. The two ends of the cooling tube 3 are connected to respective manifolds 91 and 92 in the form of vertically extending pipes. Connection of the cooling tube ends can be by any well known manner, for example, by welding. The manifolds 91 and 92 are fixed on the base plate 21 closer to one side of the base plate 21. Bores 22 and 23 are formed in the base plate 21. One end of the bore 22 is open at the front edge 21A, and the bore 22 communicates to the manifold 91. One end of the bore 23 is open at the back edge 21B, and the bore 23 communicates to the manifold 92. Peripherally projecting shoulder is formed at the one end of the bore 23 for mounting an O-ring 8. A bore 24 longitudinally extends through the base plate 21 closer to the other side of the base plate 21. Peripherally projecting shoulder is formed in the bore 24 at the back edge 21B for mounting an O-ring 8. The coils 4 are wound around respective cores 2 divided for each magnetic pole. The cores 2 are preferably formed by laminating thin silicon-steel plates and welding or gluing them together. One of the three coiled cores 2 is horizontally inserted into the fold of the cooling tube 3, as illustrated in FIG. 1. Then, the other two coiled cores 2 are positioned on the base plate 21 so that the two coils 4 are aligned with the one coil 4, then glued to the outer surface of the folded cooling tube 3. The three coiled cores 2 are attached to the base plate 21 by respective pairs of bolts 93. Adjoining cores 2 are connected to each other by their wider yoke sections. The cores 2, the coils 4, the cooling tube 3 and the manifolds 91 and 92 are covered with a rectangular resin block 25. A stay 60 is positioned on the corner of the resin block 25 at the front edge 21A. Three connectors 6 in the form of sockets are attached to the stay 60. A stay 50 is positioned on the corner of the resin block 25 at the back edge 21B. Three connectors 5 in the form of plugs, which can be inserted into the sockets 6, are attached to the stay 50.

A method of forming the resin block 25 will be briefly described. The stays 60 and 50 are temporarily fastened by bolts to the inside coners of a rectangular mold. The mold is positioned on the base plate 21 over devices such as the coils 4. Molten insulating resin material is injected into the mold until the pole faces of the cores 2 are covered. The hardened resin block is finished so as to expose the pole faces.

Secondly, the front module 10 will be described in detail. Similar devices are labeled with similar reference numerals being used for the intermediate module 20, and explanation will be omitted. The front module 10 includes a rectangular base plate 11, which is longer than the base plate 21. Three coils 4 and a pole sensor 16 can be placed on the base plate 11. The base plate 11 has a front edge 11A and a back edge 11B both of which extend in the lateral direction Y. The back edge 11B faces the front edge 21A of the base plate 21. The cores 2, the coils 4, the cooling tube 3 and the manifolds 91 and 92 are covered with a rectangular resin block 15. In preparation for forming the resin block 15, the lead wires of the coils 4 are located on the outer side of the mold, and the pole sensor 16 is temporarily fastened to the inside of the mold. The pole sensor 16 is positioned at the middle of the front edge 11A for detecting the position of the armature 1 relative to a row of permanent magnets. The pole sensor 16, for example, comprises a hall device for converting a flux density into a potential difference. A bore 12 is formed in the base plate 11 and communicates to the manifold 91. One end of the bore 12 is open at the front edge 11A, and a coupling 94 is attached into the opening of the bore 12. A bore 14 longitudinally extends through the base plate 11. A coupling 95 is attached into one opening of the bore 14 at the front edge 13A. A peripherally projecting shoulder is formed in the other opening of the bore 14 at the back edge 11B for mounting an O-ring 8. The bores 12 and 14 can be connected to respective external tubes by the couplings 94 and 95. Coolant may be introduced into one of the bores 12 and 14 and discharged from the other. The stay 50 is positioned at the corner of the resin block 15 so as to face the stay 60 of the intermediate module 20. The front module 10 does not include a stay 60.

Lastly, a back module 30 will be described in detail. A back module 30 includes a rectangular base plate 31, which is shorter than the base plate 21. Neither a coil 4 nor a cooling tube 3 is provided on the baseplate 31. The base plate 31 has a front edge 31A that extends in the lateral direction Y and faces the back edge 21B of the intermediate module 21. A turning bore 32 is formed in the base plate 31 and has two openings at the front edge 31A. One opening of the turning bore 32 faces the bore 23 and the other opening faces the bore 24. The stay 60 is positioned at the corner of a resin block 35 so as to face the stay 50 of the intermediate module 20. The back module 30 does not include a stay 50.

The front module 10, at least one intermediate module 20, and the back module 30 are rigidly connected in a line in the longitudinal direction X by four long bolts 9. Four holes 39 are formed in the base plate 31 so as to threadingly engage threaded tip ends of the bolts 9. Longitudinally extending bores 19 and 29, for insertion of the bolts 9, are formed in the base plates 11 and 21, respectively. A pair of positioning pins 7 are provided between the adjoining base plates to accurately align the modules. Pairs of holes 17, into which pins 7 can fit, are formed in the back edge 11B, the front and back edges 21A and 21B and the front edge 31A. Some bores 18 with couterbores are formed in the base plates 11 and 21. Bolts may be inserted into the bores 18 when the linear motor armature 1 is attached to a machine tool. The linear motor armature 1 may be a mover or a stator. When all of the modules are aligned and fastened together, the bore 23 of the base plate 11 is connected to the bore 22 of the base plate 21 and the bore 23 of the base plate 21 is connected to the bore 32. Also, the bore 32 is connected to the bore 24 which is connected to the bore 14. Coolant can be supplied from an external tube into a linear motor armature 1 by the coupling 94 and flow through the bore 12, the manifold 91, the flat cooling tube 3, the manifold 92 and the bore 23 of the front module 10. Further, coolant can flow through the bore 22, the manifold 91, the flat cooling tube 3, the manifold 92 and the bore 23 of the intermediate module 20, and the turning bore 32, the bore 24 and the bore 14. Coolant can be discharged to an external tube by the coupling 95. Thus, coils 4 in a linear motor armature 1 are effectively cooled irrespective of the number of intermediate modules 20.

Figure 5:
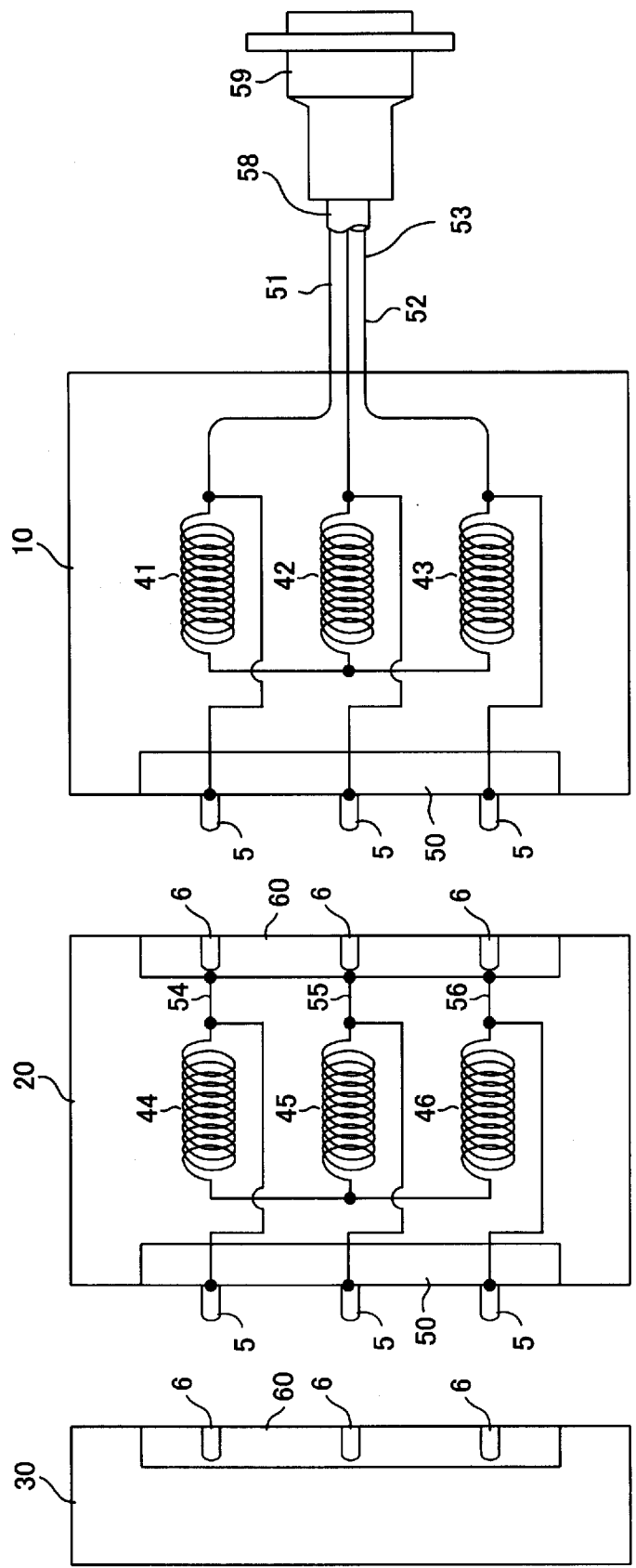
FIG. 5 is a plan view depicting an electrical connection of the linear motor armature of FIG. 1.

A three-phase circuit of the linear motor armature 1 will be described with reference to FIG. 5, For purposes of simplification, the linear motor armature 1 in FIG. 5 includes only one intermediate module 20.

Three conductors 51, 52 and 53, for delivering a three-phase current, are contained in a cable 58, and their one ends are connected to a connector 59. The other ends of the conductors 51, 52 and 53 are connected to respective one ends of the coils 41, 42 and 43 in the front module 10. The other ends of the coils 41, 42 and 43 are short-circuited. Branch wires of the conductors 51, 52 and 53 are connected to respective plugs 5 in the front module 10. Conductors 54, 55 and 56 having one end connected to respective sockets 6 in the intermediate module 20, are connected to respective ends of the coils 44, 45 and 46 in the intermediate module 20. The other ends of the coils 44, 45 and 46 are short-circuited. Branch wires of the conductors 54, 55 and 56 are connected to respective plugs 5. The sockets 6 in the back module 30 are open.

The foregoing description of preferred embodiments of the invention have been presented for purposes of illustration and description only. It is not intended to be exhaustive or to limit the invention to the precise form enclosed, and obviously many modifications and variations are possible in light of the above teaching. It is intended that the scope of the invention be defined by the claims appended hereto.

What is claimed is:

1. A linear motor armature comprising:
a front module including an inlet connection to the outside of the armature, an outlet connection to the outside of the armature, a first fluid passage one end of which is adapted to receive the inlet connection and the other end of which is open to a back edge of the front module, and a fifth fluid passage one end of which is adapted to receive the outlet connection and the other end of which is open at the back edge of the front module;
at least two intermediate modules, each intermediate module including a second fluid passage one end of which is open at a front edge of the intermediate module and the other end of which is open at a back edge of the intermediate module, a fourth fluid passage one end of which is open at the front edge of the intermediate module and the other end of which is open at the back edge of the intermediate module, a coil, a core around which the coil is wound, and a flat cooling tube partly forming one of the second and fourth fluid passages and having a U-shaped fold into which the coil can be fit;

a back module including a third fluid passage both ends of which are open at a front edge of the back module; and connecting means for detachably connecting the front module, the at least two intermediate module and the back module in series;

wherein when the front module, the at least two intermediate modules and the back module are connected in series, coolant can be circulated in the first fluid passage, the second fluid passages, the third fluid passage, the fourth fluid passages and fifth fluid passage in order.

2. The linear motor armature according to claim 1, wherein the front module includes a pole sensor for detecting the position of the armature relative to a row of permanent magnets.

3. The linear motor armature according to claim 1, wherein the front module includes a coil, and a flat cooling tube partly forming one of the first and fifth fluid passages and having a U-shaped fold into which the coil can be fit.

4. The linear motor armature according to claim 3, wherein the front module includes a base plate that has a bore therein forming the other of the first and fifth fluid passages.

5. The linear motor armature according to claim 1, wherein each of the at least two intermediate modules include a base plate which has a bore therein forming the other of the second and fourth fluid passages.

6. The linear motor armature according to claim 1, wherein the back module includes a base plate that has a bore therein forming the third fluid passages.

7. A method of manufacturing a linear motor armature comprising the steps of:

providing a front module including a first fluid passage, one end of which is connected to the outside of the armature and the other end of which is open to a back edge of the front module, and a fifth fluid passage one end of which is connected to the outside of the armature and the other end of which is open at the back edge of the front module;

providing at least two intermediate modules, each intermediate module including a second fluid passage, one end of which is open at a front edge of the intermediate module and the other end of which is open at a back edge of the intermediate module, a fourth fluid passage, one end of which is open at the front edge of the intermediate module and the other end of which is open at the back edge of the intermediate module, a coil, a core around which the coil is wound and a flat cooling tube partly forming one of the second and fourth fluid passages and having a U-shaped fold into which the coil can be fit;

providing a back module including a third fluid passage, both ends of which are open at a front edge of the back module; and connecting the front module, the at least two intermediate modules and the back module in series so that coolant can be circulated in the first fluid passage, the second fluid passages, the third fluid passage, the fourth fluid passages and fifth fluid passage in order.

8. A linear motor armature comprising:

a front module including a first fluid passage, and a fifth fluid passage;

at least two intermediate modules connectable to said front module each intermediate module comprising a second fluid passage, a fourth fluid passage, a coil and a core around which the coil is wound;

a back module connectable to said at least two intermediate modules comprising a third fluid passage; and connecting means for detachably connecting the front module, the at least two intermediate modules and the back module in series;

wherein when the front module, the at least two intermediate modules and the back module are connected in series, coolant is circulated through the first fluid passage, the second fluid passages, the third fluid passage, the fourth fluid passages and fifth fluid passage to cool said coil.

9. The linear motor armature according to claim 8, further comprising:

a flat cooling tube partly forming one of the second or fourth fluid passages and having a U-shaped fold into which the coil fits.

10. The linear motor armature according to claim 9, wherein:

said coolant circulates through the first fluid passage, the second fluid passage, the third fluid passage, the fourth fluid passage and the fifth fluid passage in order.

11. The linear motor armature according to claim 9, wherein each of the at least two intermediate modules include a base plate that has a bore therein forming the other of the second and fourth fluid passages.

12. The linear motor armature according to claim 8, further comprising:

a connection to the outside of the armature for one end of the first fluid passage, and an opening to a back edge of the front module for an other end of the first fluid passage;

a connection to the outside of the armature for one end of the fifth fluid passage, and an opening at the back edge of the front module for an other end of the fifth fluid passage;

an opening at a front edge of the intermediate module for one end of the second fluid passage, and an opening at a back edge of the intermediate module for an other end of the second fluid passage;

an opening at the front edge of the intermediate module for one end of the fourth fluid passage, and an opening at the back edge of the intermediate module for an other end of the fourth fluid passage; and an opening at a front edge of the back module for one end of the third fluid passage, and an opening at the front edge of the back module for an other end of the third fluid passage.

13. The linear motor armature according to claim 8, further comprising:

a pole sensor for detecting the position of the armature relative to a row of permanent magnets.

14. The linear motor armature according to claim 8, wherein the front module further comprises:

a second coil; and a flat cooling tube partly forming one of the first or fifth fluid passages, the flat cooling tube partly forming one of the first or fifth fluid passages having a U-shaped fold into which the second coil fits.

15. The linear motor armature according to claim 14, wherein the front module further comprises a base plate that has a bore therein forming the other of the first and fifth fluid passages.

16. The linear motor armature according to claim 8, wherein the back module includes a base plate that has a bore therein forming the third fluid passages.

* * * * *